(12) United States Patent
Nakao et al.

(10) Patent No.: US 12,506,179 B2
(45) Date of Patent: Dec. 23, 2025

(54) NON-AQUEOUS ELECTROLYTE SECONDARY BATTERY WITH FIXING TAPE HAVING A LAMINATED STRUCTURE

(71) Applicant: SANYO Electric Co., Ltd., Osaka (JP)

(72) Inventors: Takaki Nakao, Osaka (JP); Kei Kobayashi, Osaka (JP); Miho Komori, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 624 days.

(21) Appl. No.: 17/909,837

(22) PCT Filed: Mar. 12, 2021

(86) PCT No.: PCT/JP2021/009988
§ 371 (c)(1),
(2) Date: Sep. 7, 2022

(87) PCT Pub. No.: WO2021/187348
PCT Pub. Date: Sep. 23, 2021

(65) Prior Publication Data
US 2024/0204259 A1    Jun. 20, 2024

(30) Foreign Application Priority Data

Mar. 19, 2020    (JP) ................. 2020-049151

(51) Int. Cl.
*H01M 10/0587* (2010.01)
*H01M 50/119* (2021.01)
*H01M 50/595* (2021.01)

(52) U.S. Cl.
CPC ..... *H01M 10/0587* (2013.01); *H01M 50/119* (2021.01); *H01M 50/595* (2021.01)

(58) Field of Classification Search
CPC ........... H01M 10/0587; H01M 50/119; H01M 50/595
See application file for complete search history.

(56) References Cited

U.S. PATENT DOCUMENTS

| 2006/0154138 A1 | 7/2006 | Miyamoto et al. |
| 2007/0154787 A1 | 7/2007 | Jang et al. |

(Continued)

FOREIGN PATENT DOCUMENTS

| CN | 104576977 A | * | 4/2015 | ........ H01M 10/0431 |
| JP | H0547419 A | | 2/1993 | |

(Continued)

OTHER PUBLICATIONS

WO 2018105398 English Translation (Year: 2018).*

(Continued)

*Primary Examiner* — Jimmy Vo
(74) *Attorney, Agent, or Firm* — WHDA, LLP (57) ABSTRACT

The purpose of the present disclosure is to provide a non-aqueous electrolyte secondary battery in which polar plate deformation at the outermost periphery of an electrode body due to charge/discharge cycles can be inhibited. A non-aqueous electrolyte secondary battery comprises a wound electrode body in which a rectangular positive electrode and a rectangular negative electrode are wound with a separator interposed therebetween, and a metal exterior body that accommodates the electrode body. The negative electrode is exposed on the outermost peripheral surface of the electrode body, and a fixing tape that fixes the wind-terminating end of the negative electrode is affixed to the outermost peripheral surface of the electrode body. The fixing tape has a layered structure comprising two or more mutually independent layers.

3 Claims, 4 Drawing Sheets

(56) References Cited

U.S. PATENT DOCUMENTS

| | | |
|---|---|---|
| 2010/0310912 A1 | 12/2010 | Kim et al. |
| 2014/0242433 A1 | 8/2014 | Kwon et al. |
| 2015/0104684 A1 | 4/2015 | Kim et al. |
| 2020/0076005 A1 | 3/2020 | Oki et al. |
| 2020/0373626 A1 | 11/2020 | Imanishi et al. |
| 2021/0005871 A1 | 1/2021 | Kobayashi et al. |
| 2021/0249698 A1 | 8/2021 | Mizawa et al. |

FOREIGN PATENT DOCUMENTS

| | | |
|---|---|---|
| JP | 2005-216754 A | 8/2005 |
| JP | 2007-184238 A | 7/2007 |
| JP | 2009-199974 A | 9/2009 |
| JP | 4568123 B2 | 10/2010 |
| JP | 2015-534239 A | 11/2015 |
| JP | 2016-122533 A | 7/2016 |
| KR | 2007-0097146 A | 10/2007 |
| KR | 101118259 B1 | 3/2012 |
| WO | WO-2018105398 A1 * | 6/2018 ........ H01M 10/0587 |
| WO | 2019/111742 A1 | 6/2019 |
| WO | 2019/187755 A1 | 10/2019 |
| WO | 2019/244817 A1 | 12/2019 |

OTHER PUBLICATIONS

CN 104576977 (Year: 2015).*
International Search Repot dated May 25, 2021, issued in counterpart PCT/JP2021/009988, with English Translation. (5 pages).
Written Opinion dated May 25, 2021, issued in counterpart PCT/JP2021/009988. (3 pages).
Extended Supplementary European Search Report dated Jun. 6, 2024, issued in counterpart Application No. 21771140.7. (9 pages).

* cited by examiner

NON-AQUEOUS ELECTROLYTE SECONDARY BATTERY WITH FIXING TAPE HAVING A LAMINATED STRUCTURE

CROSS-REFERENCE TO RELATED APPLICATION

This application is a National Phase Application filed under 35 U.S.C. § 371 of International Application No. PCT/JP2021/009988 filed on Mar. 12, 2021, which claims the benefit of priorities under 35 U.S.C. § 119(a) of Japanese Patent Application No. 2020-049151 filed in Japan on Mar. 19, 2020, the contents of which are incorporated herein by reference.

TECHNICAL FIELD

The present disclosure relates to a non-aqueous electrolyte secondary battery.

BACKGROUND ART

There has been conventionally widely used a non-aqueous electrolyte secondary battery in which a winding-type electrode assembly having a belt-shaped positive electrode and a belt-shaped negative electrode wound via a separator is housed in an exterior member. With this battery, the outermost periphery of the electrode assembly is fixed in order that the winding does not loosen after being wound, and especially when the electrode assembly is inserted into the exterior member, in order to prevent its outermost peripheral portion from being turned up, an end portion of the electrode assembly is fixed with a tape in some cases (refer to PATENT LITERATURES 1 and 2).

CITATION LIST

Patent Literature

PATENT LITERATURE 1: Japanese Unexamined Patent Application Publication No. 2009-199974
PATENT LITERATURE 2: Japanese Unexamined Patent Application Publication No. 2005-216754

SUMMARY

Technical Problem

Now, in some cases the electrode assembly of the non-aqueous electrolyte secondary battery expands in charging to receive a pressure from the exterior member at its outermost periphery. Moreover, repetition of charge-discharge causes the pressure to be larger since the electrode assembly expands larger than in the initial stage. Since the fixing tape is pasted on the outermost peripheral surface of the electrode assembly, such repetition of charge-discharge occasionally causes deformation of an electrode plate that the outermost periphery of the electrode assembly is composed of starting from an end portion of the fixing tape which stress tends to concentrate at. Since a larger deformation of the electrode plate more causes a concern that internal short circuit is to occur, it is an important issue to restrain deformation of the electrode plate.

It is therefore an advantage of the present disclosure to provide a non-aqueous electrolyte secondary battery capable of restraining deformation of an electrode plate at the outermost periphery of an electrode assembly due to charge-discharge cycles.

Solution to Problem

There is provided a non-aqueous electrolyte secondary battery according to an aspect of the present disclosure, comprising: a winding-type electrode assembly having a belt-shaped positive electrode and a belt-shaped negative electrode wound via a separator; and a metal-made exterior member housing the electrode assembly, wherein on an outermost peripheral surface of the electrode assembly, the negative electrode is exposed, and a fixing tape that fixes a winding finishing end part of the negative electrode is pasted, and the fixing tape has a laminate structure composed of two or more independent layers.

Advantageous Effects of Invention

According to the non-aqueous electrolyte secondary battery according to the present disclosure, deformation of an electrode plate at the outermost periphery of the electrode assembly due to charge-discharge cycles can be restrained.

DESCRIPTION OF EMBODIMENTS

Hereafter, an example of embodiments of a cylindrical secondary battery according to the present disclosure will be described in detail with reference to the drawings. In the description below, specific shapes, materials, numerical value, orientations, and the like are exemplary illustrations to facilitate understanding of the present invention, and can be properly modified to meet the specifications of the cylindrical secondary battery. Moreover, an exterior member is not limited to being in a cylindrical shape but may be in a rectangular shape or the like. Moreover, when plural embodiments and modifications are included in the description below, it is supposed from the first that characteristic portions of those be properly combined and used.

Figure 1:
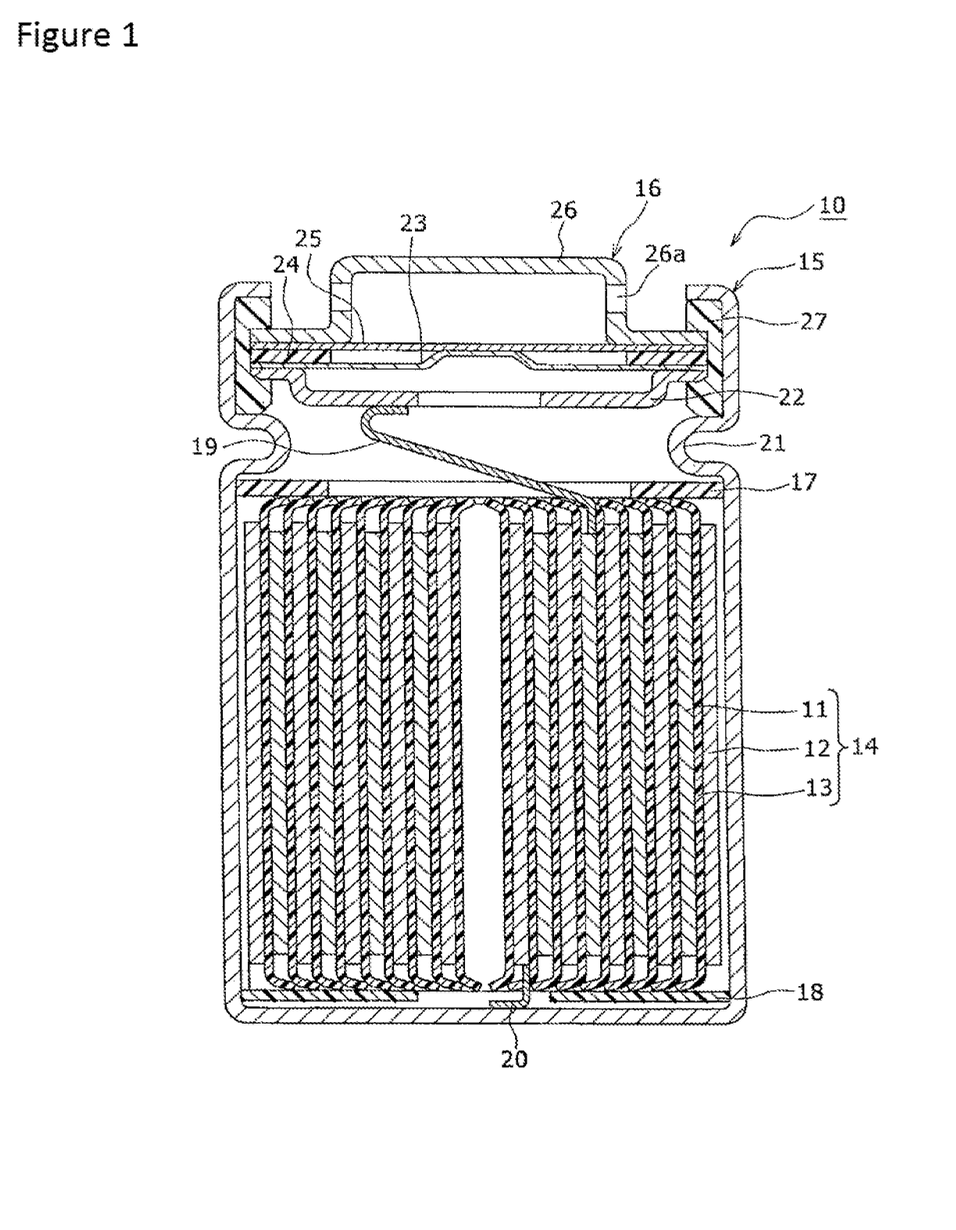
FIG. 1 is an axial sectional view of a cylindrical secondary battery as an example of embodiments.

FIG. 1 is an axial sectional view of a cylindrical secondary battery 10 as an example of embodiments. The secondary battery 10 shown in FIG. 1 has an electrode assembly 14 and a non-aqueous electrolyte (not shown) which are housed in an exterior member 15. The electrode assembly 14 has a winding-type structure configured by winding a positive electrode 11 and a negative electrode 12 via a separator 13. For a non-aqueous solvent (organic solvent) in the non-aqueous electrolyte, carbonates, lactones, ethers, ketones, esters, and the like can be used, and two kinds or more of these solvents can be mixed and used. When two kinds or more of the solvents are mixed and used, a mixed solvent including a cyclic carbonate and a chain carbonate is preferably used. For example, for the cyclic carbonate, ethylene carbonate (EC), propylene carbonate (PC), butylene carbonate (BC), and the like can be used, and for the chain carbonate, dimethyl carbonate (DMC), ethyl methyl carbonate (EMC), diethyl carbonate (DEC), and the like can be used. For an electrolyte salt in the non-aqueous electrolyte, $LiPF_6$, $LiBF_4$, $LiCF_3SO_3$, and the like and mixtures of these can be used. The amount of the electrolyte salt dissolved in the non-aqueous solvent can be 0.5 to 2.0 mol/L, for example. Notably, description is hereafter made, regarding the side of a sealing assembly 16 as being on the "upside" and the bottom part side of the exterior member 15 as being on the "downside," for convenience of description.

By the opening end part of the exterior member 15 being closed by the sealing assembly 16, the interior of the secondary battery 10 is sealed. Insulating plates 17 and 18 are provided respectively on the upside and the downside of the electrode assembly 14. A positive electrode lead 19 extends toward the upside through a through hole of the insulating plate 17, and is welded onto a lower surface of a filter 22 which is a bottom plate of the sealing assembly 16. In the secondary battery 10, a cap 26 which is a top board of the sealing assembly 16 and is electrically connected to the filter 22 is a positive electrode terminal. Meanwhile, a negative electrode lead 20 extends to the bottom part side of the exterior member 15 through a through hole of the insulating plate 18, and is welded onto an inner surface of the bottom part of the exterior member 15. In the secondary battery 10, the exterior member 15 is a negative electrode terminal.

The exterior member 15 is a bottomed cylindrical metal-made exterior can. Accordingly, when the battery receives stress from the outside, it is hard and scarcely deforms, which can protect the interior. On the other hand, when the electrode assembly 14 expands due to repetition of charge-discharge, the metal-made exterior member 15 is hard and scarcely deforms, which therefore results in a large pressure which the electrode assembly 14 receives from the exterior member 15.

As mentioned above, the exterior member 15 may be rectangular. Nevertheless, since the cylindrical exterior member 15 has a circular horizontal cross section and allows stress inside the battery to disperse evenly, it more scarcely expands than a rectangular exterior member having a flat part which readily expands, and tends to result in a large pressure which the electrode assembly 14 receives from the exterior member 15. Therefore, since when the exterior member 15 is cylindrical, an electrode plate which the outermost periphery of the electrode assembly is composed of tends to deform starting from an end portion of a fixing tape, the effects of the present disclosure tend to be exhibited.

A gasket 27 is provided between the exterior member 15 and the sealing assembly 16, and a sealing property inside the secondary battery 10 is secured. The exterior member 15 has a grooved part 21 which supports the sealing assembly 16 and is formed, for example, by pressing its lateral surface part from the outside. The grooved part 21 is preferably formed into an annular shape along the circumferential direction of the exterior member 15, and supports the sealing assembly 16 via the gasket 27 on its upper surface.

The sealing assembly 16 has the filter 22, a lower vent member 23, an insulating member 24, an upper vent member 25, and the cap 26, these being laminated sequentially from the electrode assembly 14 side. The members which the sealing assembly 16 is composed of each have, for example, a disc shape or a ring shape, and the members except the insulating member 24 are electrically connected to one another. The lower vent member 23 and the upper vent member 25 are connected to each other at their center parts, and the insulating member 24 is interposed between their peripheral edges. When an internal pressure of the battery rises due to abnormal heat generation, the lower vent member 23 by way of example fractures, thereby, the upper vent member 25 expands toward the cap 26 side to be separated from the lower vent member 23, and thereby, electric connection between both is interrupted. When the internal pressure further rises, the upper vent member 25 fractures, and gas is discharged from an opening 26a of the cap 26.

Figure 2:
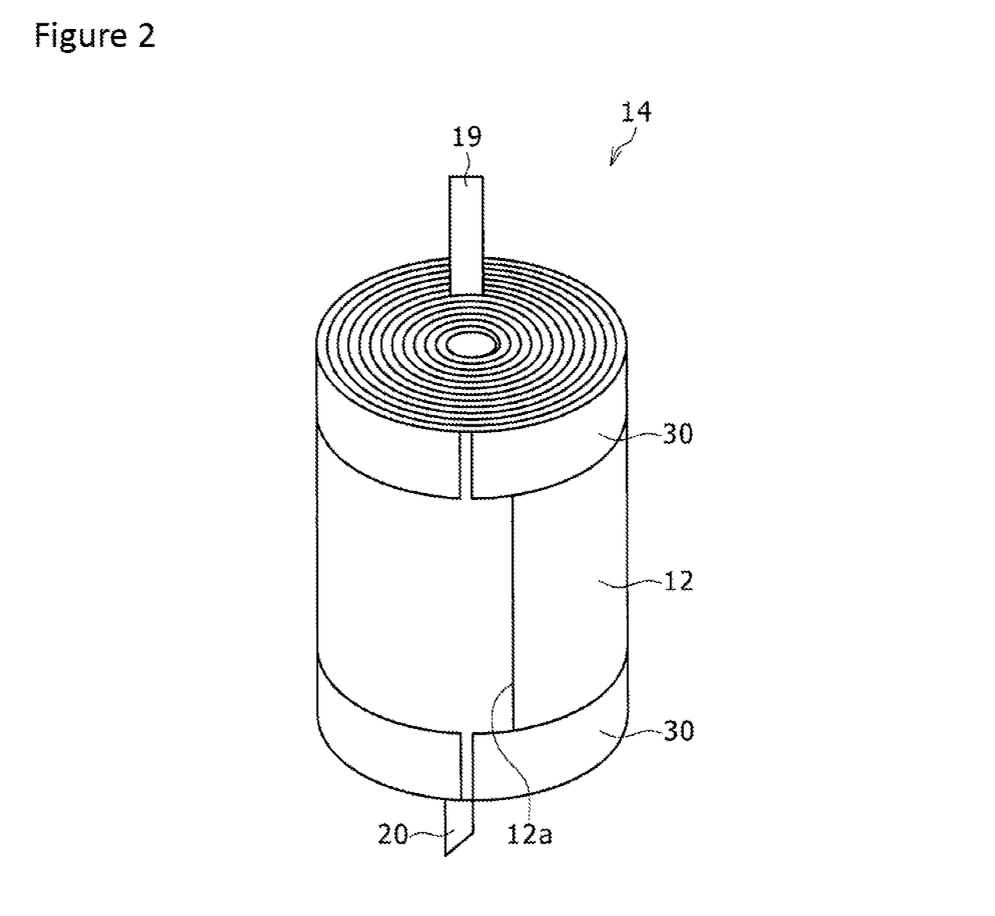
FIG. 2 is a perspective view of an electrode assembly which the secondary battery shown in FIG. 1 comprises.

Next, the electrode assembly 14 is described with reference to FIG. 2. FIG. 2 is a perspective view of the electrode assembly 14. As mentioned above, the electrode assembly 14 has a winding structure configured by winding the belt-shaped positive electrode 11 and the belt-shaped negative electrode 12 into a spiral shape via the separator 13. The positive electrode 11, the negative electrode 12, and the separator 13 each are formed into a belt shape, and are wound into a spiral shape around a winding core arranged along the winding axis, thereby being put into the state of being laminated alternately in the radial direction of the electrode assembly 14. In the radial direction, the winding axis side is called the inner periphery side, and its opposite side is called the outer periphery side. In the electrode assembly 14, the longitudinal directions of the positive electrode 11 and the negative electrode 12 each are the winding direction, and the band-width directions of the positive electrode 11 and the negative electrode 12 each are the axial direction. As shown in FIG. 2, the negative electrode 12 is exposed on the outermost peripheral surface of the electrode assembly 14.

The positive electrode 11 has a belt-shaped positive electrode current collector and positive electrode mixture layers formed on both surfaces of the positive electrode current collector. For the positive electrode current collector, there is used, for example, foil of a metal such as aluminum, a film having the metal disposed on surface layers, or the like. The positive electrode mixture layer may include, for example, a positive electrode active material, binder, a conductive agent, and the like. The positive electrode 11 can be produced, for example, by applying and drying positive electrode mixture slurry including the positive electrode active material, the binder, the conductive agent, and the like on the positive electrode current collector to form the positive electrode mixture layers, and after that, rolling these positive electrode mixture layers.

Examples of the positive electrode active material can include lithium-containing transition metal oxides containing transition metal elements such as Co, Mn, and Ni. The lithium-containing transition metal oxide is not specially limited but is preferably a composite oxide expressed by the general formula $Li_{1+x}MO_2$ (in the formula, $-0.2<x\leq0.2$, and M includes at least one of the group consisting of Ni, Co, Mn, and Al).

Examples of the conductive agent include carbon materials such as carbon black (CB), acetylene black (AB), Ketjen black, and graphite. Examples of the binder include fluorine-based resins such as polytetrafluoroethylene (PTFE) and polyvinylidene fluoride (PVdF), polyacrylonitrile (PAN), polyimide (PI), acrylic resins, and polyolefin-based resins. Moreover, together with these resins, carboxymethylcellulose (CMC) or its salt, polyethylene oxide (PEO), and the like may be used. For each of the conductive agent and the binder, a single kind of those may be solely used or two kinds or more of those may be combined and used.

There is provided, in a part of the positive electrode 11, a positive electrode current collector exposed part where a surface of the positive electrode current collector is not covered with the positive electrode mixture layer. For example, the positive electrode current collector exposed part is provided by intermittent application applying no positive electrode mixture slurry on a part of the positive electrode current collector. One end of the positive electrode lead 19 is connected to the positive electrode current collector exposed part by ultrasonic welding or the like, and the other end of the positive electrode lead 19 extends, in the axial direction, from a substantial center between the center and the outermost periphery in the radial direction, at the upper end of the electrode assembly 14 as shown in FIG. 2.

The negative electrode 12 has a belt-shaped negative electrode current collector and negative electrode mixture layers formed on both surfaces of the negative electrode current collector. For the negative electrode current collector, there is used, for example, foil of a metal such as copper, a film having the metal disposed on surface layers, or the like. The negative electrode mixture layer may include, for example, a negative electrode active material, binder, and the like. The negative electrode 12 can be produced, for example, by applying and drying negative electrode mixture slurry including the negative electrode active material, the binder, thickener, and the like on the negative electrode current collector to form the negative electrode mixture layers, and after that, rolling these negative electrode mixture layers.

Examples of the negative electrode active material can include, as carbon materials which can store and release lithium ions, graphite, hardly graphitizable carbon, easily graphitizable carbon, fibrous carbon, coke, and carbon black. Examples of the negative electrode active material as a noncarbon-based material can include silicon, tin, and alloys and oxides mainly including these.

For the binder, while PTFE or the like can be used as with the case of the positive electrode, styrene-butadiene copolymer (SBR), its modification, or the like may be used. For the thickener, carboxymethylcellulose (CMC), its salt, or the like can be used. For each of the binder and the thickener, a single kind of those may be solely used or two kinds or more of those may be combined and used.

There is provided, near a winding starting end part of the negative electrode 12, a negative electrode current collector exposed part where a surface of the negative electrode current collector is not covered with the negative electrode mixture layer. For example, the negative electrode current collector exposed part is provided by intermittent application applying no negative electrode mixture slurry on a part of the negative electrode current collector. One end of the negative electrode lead 20 is connected to the negative electrode current collector exposed part by ultrasonic welding or the like, and the other end of the negative electrode lead 20 extends, in the axial direction, from the vicinity of the winding axis, at the lower end of the electrode assembly 14 as shown in FIG. 2.

A negative electrode current collector exposed part is preferably provided also near a winding finishing end part 12a of the negative electrode 12, and the whole outermost peripheral surface of the electrode assembly 14 is still preferably the negative electrode current collector exposed part. Since this secures a current path to the exterior member 15 via the outermost peripheral surface of the negative electrode 12, output characteristics of the battery are improved.

For the separator 13, there is used a porous sheet having ion permeability and insulation ability, or the like, for example. Specific examples of the porous sheet include a microporous film, woven fabric, nonwoven fabric. The material of the separator is preferably an olefin-based resin such as polyethylene or polypropylene, cellulose, or the like. The separator 13 may be a laminate body having a cellulose fiber layer and a thermoplastic resin fiber layer such as an olefin-based resin. Instead, it may be a multilayer separator including a polyethylene layer and a polypropylene layer, or the separator 13 on a surface of which a material such as aramid-based resin or ceramics is applied may be used.

In the example shown in FIG. 2, on the outermost peripheral surface of the electrode assembly 14, the negative electrode 12 is exposed, and fixing tapes 30 that fix the winding finishing end part 12a of the negative electrode 12 are pasted. While the positions and the number of the fixing tapes 30 are not specially limited as long as they can fix the winding finishing end part 12a, for example, each of both ends of the electrode assembly 14 in the axial direction may have one of them as show in FIG. 2, or any one of the end portions of the electrode assembly 14 in the axial direction may solely has it.

A length of the fixing tape 30 is preferably close to a circumferential length (length of one circumference) of the outermost peripheral surface of the electrode assembly 14, and as shown in FIG. 2, may be smaller than the length of the outermost periphery of the electrode assembly 14 such that one end and another end thereof in the longitudinal direction do not overlap. Since if the pasting region of the fixing tape 30 is locally biased, a pressure from the exterior member 15 locally concentrates in expansion of the electrode assembly 14 and the effect of restraining deformation of the negative electrode 12 is reduced, the distance between the one end and the other end of each fixing tape 30 shown in FIG. 2 is preferably short in the longitudinal direction.

A width of each fixing tape 30 is preferably not less than 10% and not more than 40% of the height of the electrode assembly 14. Moreover, the total of the widths of the fixing tapes 30 on the outermost peripheral surface of the electrode assembly 14 is further preferably not less than 20% of the height of the electrode assembly 14. The width of each of the fixing tapes 30 is set within such a range, thereby, there balance each other the friction forces between the exterior member 15 and the fixing tapes 30 and the adhesive forces between layers that the fixing tapes 30 are composed of, and as mentioned later, the individual layers easily and independently slip on the occasion when the electrode assembly 14 expands due to repetition of charge-discharge, which can significantly restrain deformation of the negative electrode 12. A specific example of the width of the fixing tape 30 is 3 mm to 30 mm and may be 5 mm to 15 mm.

Figure 3:
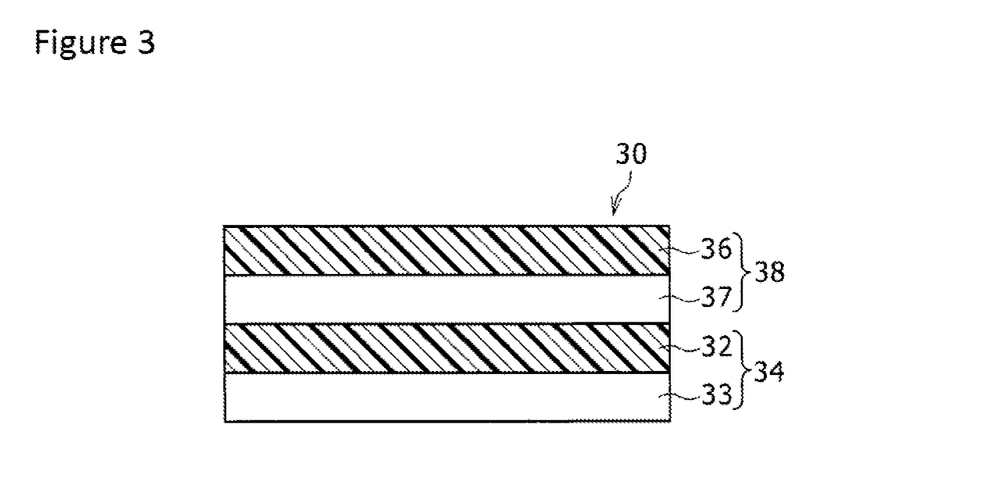
FIG. 3 is a sectional view of a fixing tape in an example of embodiments.

Next, a configuration of the fixing tape 30 is described with reference to FIG. 3. FIG. 3 is a sectional view of the fixing tape 30 in an example of embodiments. The fixing tape 30 has a laminate structure composed of two or more independent layers, and in the example of FIG. 3, the fixing tape 30 has a first layer 34 composed of a first base material layer 32 and a first pressure-sensitive adhesive layer 33, and a second layer 38 composed of a second base material layer 36 and a second pressure-sensitive adhesive layer 37. Herein, the laminate structure composed of two or more independent layers is a structure in which each layer has both ends in the longitudinal direction, and, for example, is not a structure formed by pasting one tape that is composed of one layer having: a base material layer; and a pressure-sensitive adhesive layer such that these overlap. The individual layers which the laminate structure is composed of are independent of one another, and thereby as mentioned later, the individual layers easily and independently slip on the occasion when the electrode assembly 14 expands due to repetition of charge-discharge, which can restrain deformation of the negative electrode 12. In the fixing tape 30, the second layer 38 is laminated on the first layer 34, and the first pressure-sensitive adhesive layer 33 of the first layer 34 is pasted on the outermost peripheral surface of the electrode assembly 14. The number of laminated layers that the fixing tape 30 is composed of is not specially limited as long as it is two or more, but is two or more and four or less, for example.

The first base material layer 32 and the second base material layer 36 can be properly selected in view of their strength, durability against the electrolytic solution, processability, costs, and the like, and for each of them, there can be used PP (polypropylene), PI (polyimide), PET (polyethylene terephthalate), PPS (polyphenylene sulfide), and the like, for example. Not limited to the first base material layer 32 or the second base material layer 36, a plurality of base material layers may have the same materials as one another or may have different materials. Moreover, the thicknesses of the plurality of base material layers may be the same or may be different. A thickness of each base material layer is 1 μm to 250 μm, for example, and may be 3 μm to 180 μm.

For each of the first pressure-sensitive adhesive layer 33 and the second pressure-sensitive adhesive layer 37, there is preferably used a resin having adhesion at room temperature, and there can be used acrylic resins and rubber-based resins, for example. Not limited to the first pressure-sensitive adhesive layer 33 or the second pressure-sensitive adhesive layer 37, a plurality of pressure-sensitive adhesive layers may have the same materials as one another or may have different materials. Moreover, the thicknesses of the plurality of pressure-sensitive adhesive layers may be the same or may be different. A thickness of each pressure-sensitive adhesive layer is 1 μm to 125 μm, for example, and may be 2 μm to 125 μm.

Figure 4:
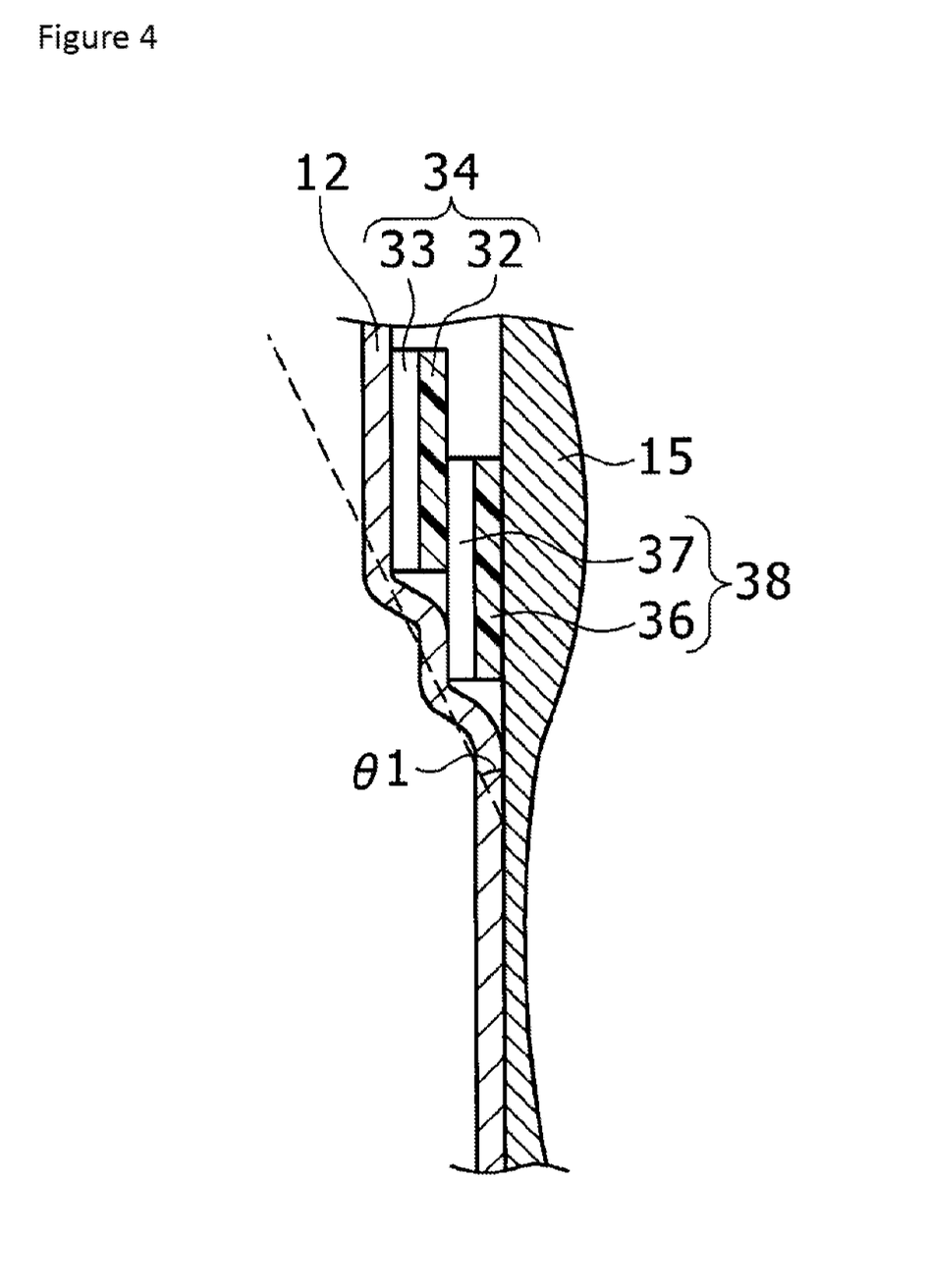
FIG. 4 is an expanded view of the vicinity of the fixing tape in a non-aqueous electrolyte secondary battery according to the present disclosure after repetition of charge-discharge.
Figure 5:
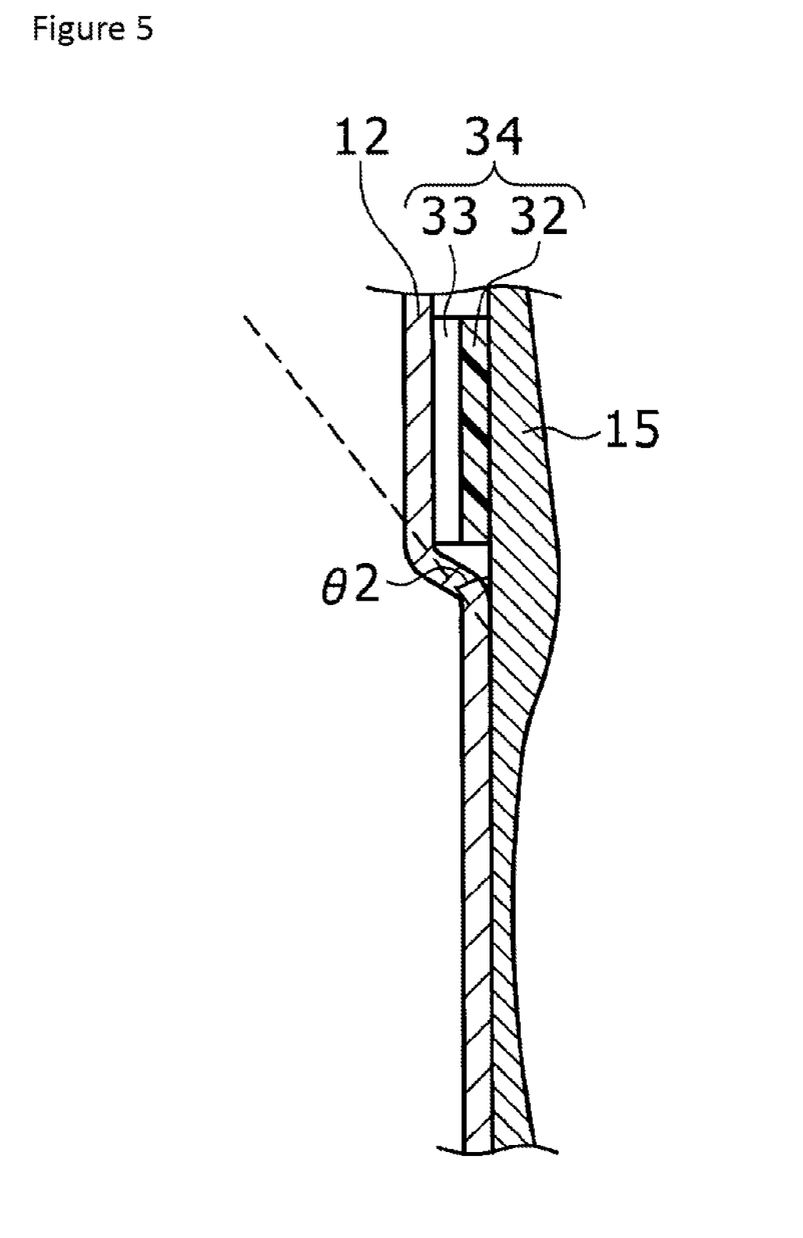
FIG. 5 is a view corresponding to FIG. 4 in a conventional non-aqueous electrolyte secondary battery.

Next, effects of the fixing tapes 30 according to the present disclosure are described with reference to FIG. 4 and FIG. 5. FIG. 4 is an expanded view of the vicinity of the fixing tape 30 in a non-aqueous electrolyte secondary battery according to the present disclosure after repetition of charge-discharge, and FIG. 5 is a view corresponding to FIG. 4 in a conventional non-aqueous electrolyte secondary battery. Repetition of charge-discharge causes the electrode assembly 14 to expand, hence, the fixing tape 30 pasted on the negative electrode 12 to be strongly pressed onto the exterior member 15, and results in a large pressure which the electrode assembly 14 receives from the exterior member 15. When a conventional tape composed of only the first layer 34 shown in FIG. 5 is used, since the first pressure-sensitive adhesive layer 33 is strongly pasted on the negative electrode 12 and does not slip, the negative electrode 12 deforms near an end portion of the tape. Near the end portion of the tape, deformation of the negative electrode 12 is larger as an angle θ2 formed by the exterior member 15 and the negative electrode 12 is larger. On the other hand, as to the fixing tape 30 of two layers according to the present disclosure shown in FIG. 4, the second pressure-sensitive adhesive layer 37 slips on the first base material layer 32 in charge-discharge, which results in a displacement between the first layer 34 and the second layer 38. Since in FIG. 4 after repetition of charge-discharge, the fixing tape 30 accordingly takes a stepped shape and an angle θ1 formed by the exterior member 15 and the negative electrode 12 is smaller than θ2 in FIG. 5, deformation of the negative electrode 12 is restrained. Since a material of the aforementioned pressure-sensitive adhesive layer pressure-sensitively adheres to the negative electrode 12 more than to that of the aforementioned base material layer, even if the same material is used for the first pressure-sensitive adhesive layer 33 and the second pressure-sensitive adhesive layer 37, the non-aqueous electrolyte secondary battery after charge-discharge takes a mode shown in FIG. 4. Moreover, as to the fixing tapes 30, one in which a plurality of layers as shown in FIG. 3 have been already laminated may be pasted on the negative electrode 12, or a tape forming the first layer 34 may be pasted on the negative electrode 12, a tape forming the second layer 38 being further pasted thereon.

EXAMPLES

While the present disclosure is further described hereafter with examples, the present disclosure is not limited to these examples.

Example 1

[Production of Positive Electrode]

As the positive electrode active material, lithium-nickel-cobalt-aluminum composite oxide expressed as $LiNi_{0.88}Co_{0.09}Al_{0.03}O_2$ was used. One hundred pts. mass of this positive electrode active material, 1 pt. mass of acetylene black (AB) as the conductive agent, and 1 pt. mass of polyvinylidene fluoride (PVDF) as the binder were mixed, and an appropriate amount of N-methyl-2-pyrrolidone (NMP) was further added to prepare the positive electrode mixture slurry. Next, this positive electrode mixture slurry was applied on both surfaces of the positive electrode current collector composed of aluminum foil, after dried by a drying machine, was cut out to have a predetermined electrode size, and was rolled using rollers to obtain a belt-shaped positive electrode. Moreover, there was formed a non-coated part where the active material was not formed, at the center part of the positive electrode in the length direction, and a positive electrode lead of aluminum was fixed to this non-coated part by ultrasonic welding.

[Production of Negative Electrode]

As the negative electrode active material, a mixture of 95 pts. mass of graphite powder and 5 pts. mass of silicon oxide was used. One hundred pts. mass of this negative electrode active material, 1 pt. mass of styrene-butadiene rubber (SBR) as the binder, and 1 pt. mass of carboxymethylcellulose (CMC) as the thickener were mixed, and an appropriate amount of water was further added to prepare the negative electrode mixture slurry. Next, this negative electrode mixture slurry was applied on both surfaces of the negative electrode current collector composed of copper foil, after dried by a drying machine, was cut out to have a predetermined electrode size, and was rolled using rollers to obtain a belt-shaped positive electrode. Moreover, there was formed a non-coated part where the active material was not formed, at one end part of the negative electrode in the length direction, and a negative electrode lead of nickel was fixed to this non-coated part by ultrasonic welding. Moreover, there was also formed a non-coated part where the active material was not formed, at another end part of the negative electrode in the length direction.

[Production of Electrode Assembly]

By winding the produced positive electrode and negative electrode via a separator into a spiral shape such that the negative electrode was located at the outermost periphery, a winding-type electrode assembly was produced. In this stage, there was caused the one end part, of the negative electrode, where the negative electrode lead was formed to be located on the inner periphery side (starting side of winding), and there was caused the non-coated part at the other end part of the negative electrode to face the outer winding side. For the separator, there was used a polyethylene-made microporous film on one surface of which a heat resistant layer in which filler of polyamide and alumina was dispersed was formed.

[Fixation of Winding Finishing End Part of Electrode Assembly]

There were prepared fixing tapes each obtained by laminating two single-layer tapes each obtained by applying 10 μm of acrylic pressure-sensitive adhesive agent on a polypropylene film with 62 mm of length, 9 mm of width, and 20 μm of thickness. These fixing tapes were pasted at both end portions of the electrode assembly in the axial direction, the end portions including the winding finishing end part of the negative electrode, as shown in FIG. 2 to fix the electrode assembly.

[Preparation of Non-Aqueous Electrolyte Solution]

To a mixed solvent having ethylene carbonate (EC), ethyl methyl carbonate (EMC), and diethyl carbonate (DEC) mixed in volume ratios of EC:EMC:DMC=3:3:4, $LiPF_6$ was added in 1 mol/L to prepare a non-aqueous electrolyte solution.

[Production of Secondary Battery]

Insulating plates were disposed respectively on the upside and the downside of the aforementioned electrode assembly, the negative electrode lead was welded to the bottom part of an exterior member, the positive electrode lead was welded to a sealing assembly, and the electrode assembly was housed in the exterior member in a bottomed cylindrical shape. After that, the non-aqueous electrolyte solution was injected to the interior of the exterior member. Furthermore, the opening end part of the exterior member was sealed with the sealing assembly via a gasket to produce a cylindrical non-aqueous electrolyte secondary battery. The capacity of the battery was 4600 mAh.

Example 2

A secondary battery was produced as with Example 1 except that in fixation of the winding finishing end part of the electrode assembly, three of the single-layer tapes were laminated to obtain each fixing tape.

Example 3

A secondary battery was produced as with Example 1 except that in fixation of the winding finishing end part of the electrode assembly, four of the single-layer tapes were laminated to obtain each fixing tape.

Comparative Example 1

A secondary battery was produced as with Example 1 except that in fixation of the winding finishing end part of the electrode assembly, one single-layer tape, not laminating single-layer tapes, was used as each fixing tape.

Comparative Example 2

A secondary battery was produced as with Claim 1 except that in fixation of the winding finishing end part of the electrode assembly, fixing tapes each were prepared from a single-layer tape obtained by applying 10 μm of acrylic pressure-sensitive adhesive agent on a polypropylene film with 124 mm of length, 9 mm of width, and 20 μm thickness, and further, were pasted such that each was laminated in the radial direction of the electrode assembly.

Table 1 presents the numbers of laminated layers, the lengths, and the widths of the individual fixing tapes used in Examples and Comparative Examples.

TABLE 1

| | Fixing Tape | | |
|---|---|---|---|
| | Number of Laminated Layers | Length | Width |
| Example 1 | 2 | 62 mm | 9 mm |
| Example 2 | 3 | 62 mm | 9 mm |
| Example 3 | 4 | 62 mm | 9 mm |
| Comparable Example 1 | 1 | 62 mm | 9 mm |
| Comparable Example 2 | 1 (Winding of Two Circumferences) | 124 mm | 9 mm |

[Evaluation of Deformation of Negative Electrode]

As to each of the secondary batteries produced for Examples and Comparative Examples, constant current charging was performed at 0.3 C of constant current in an environment of 25° C. of temperature until 4.2 V of battery voltage and constant voltage charging was performed at 4.2 V until 0.02 C of current value. After that, after 20 minutes of suspension, constant current discharging was performed at 1 C of constant current until 3.0 V of battery voltage, and then, 20 minutes of suspension was taken. With this charge-discharge cycle regarded as one cycle, 500 cycles were repeated. For the secondary battery after these 500 cycles, after performing constant current charging at 0.3 C of constant current in an environment of 25° C. of temperature until 4.2 V of battery voltage and performing constant voltage charging at 4.2 V until 0.02 C of current value, the secondary battery was taken apart to visually observe the negative electrode at the vicinity of each fixing tape on the outermost peripheral surface of the electrode assembly to evaluate deformation of the negative electrode.

In each of Examples 1 to 3, no deformation of the negative electrode was observed. On the other hand, in each of Comparative Examples 1 and 2, deformation of the negative electrode was observed. In Comparative Example 2, each fixing tape had a structure laminated into two layers, but differently from Example 1, did not have a structure having independent single-layer tapes laminated. In other words, the upper layer of the fixing tape was coupled to the lower layer thereof, and hence, the upper layer of the fixing tape was restricted from freely moving. It is inferred that in Comparative Example 2, this caused deformation of the negative electrode to be not able to be restrained.

REFERENCE SIGNS LIST

10 secondary battery, 11 positive electrode, 12 negative electrode, 12a winding finishing end part, 13 separator, 14 electrode assembly, 15 exterior member, 16 sealing assembly, 17, 18 insulating plate, 19 positive electrode lead, 20 negative electrode lead, 21 grooved part, 22 filter, 23 lower vent member, 24 insulating member, 25 upper vent member, 26 cap, 26a opening, 27 gasket, 30 fixing tape, 32 first base material layer, 33 first pressure-sensitive adhesive layer, 34 first layer, 36 second base material layer, 37 second pressure-sensitive adhesive layer, 38 second layer

The invention claimed is:

1. A non-aqueous electrolyte secondary battery, comprising:
- a winding-type electrode assembly having a belt-shaped positive electrode and a belt-shaped negative electrode wound via a separator; and
- a metal-made exterior member housing the electrode assembly, wherein
- on an outermost peripheral surface of the electrode assembly, the negative electrode is exposed, and a fixing tape that fixes a winding finishing end part of the negative electrode is pasted,
- the fixing tape has a laminate structure comprising a first tape, and a second tape separate from the first tape,
- each of the first tape and the second tape includes a base material layer and an adhesive layer, and
- the first tape is pasted on the negative electrode, and the second tape is pasted on the base material layer of the first tape.

2. The non-aqueous electrolyte secondary battery according to claim 1, wherein
- the negative electrode has a negative electrode current collector, and a negative electrode mixture layer formed on a surface of the negative electrode current collector, and
- on the outermost peripheral surface of the electrode assembly, the negative electrode current collector is exposed.

3. The non-aqueous electrolyte secondary battery according to claim 1, wherein the fixing tape is pasted at each of both ends of the electrode assembly in an axial direction.

* * * * *